3,485,012
METHOD AND DEVICE FOR REMOVING DUST FROM EXHAUST GASES

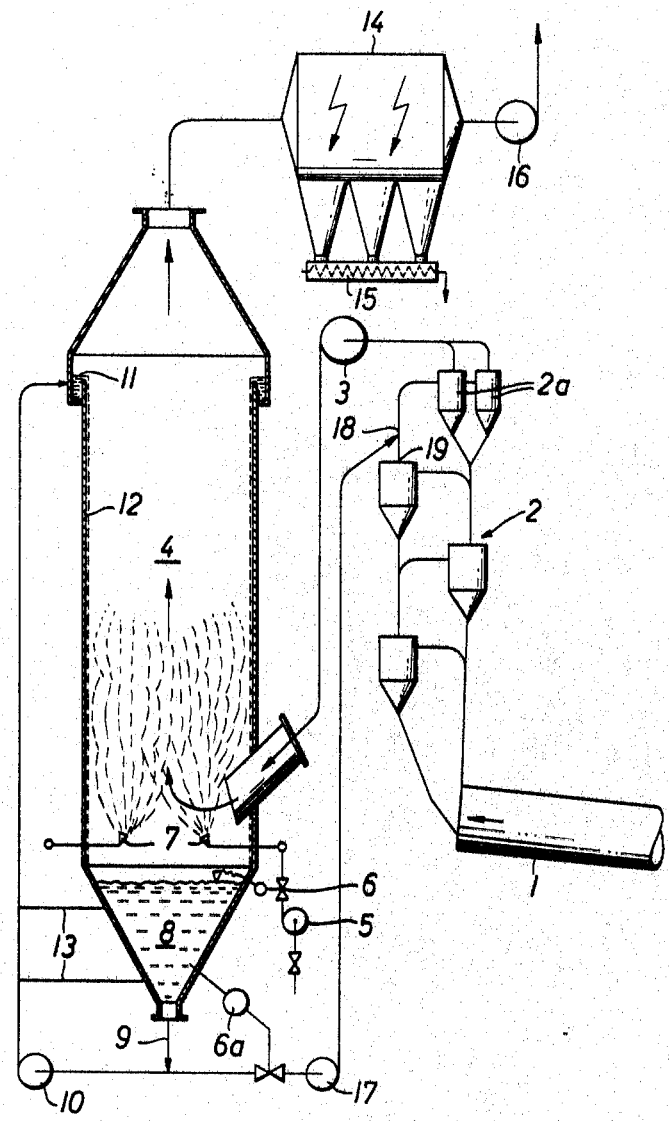

Herbert Deussner, Bensberg-Refrath, Germany, assignor to Klockner-Humboldt-Deutz AG., Cologne-Deutz, Germany, a corporation of Germany
Filed Mar. 11, 1968, Ser. No. 711,993
Claims priority, application Germany, Mar. 16, 1967, K 61,742
Int. Cl. B01d 47/12; B03c 1/10
U.S. Cl. 55—8                7 Claims

ABSTRACT OF THE DISCLOSURE

A method and device for removing dust from the exhaust gases of a cement manufacturing installation in which the dust laden exhaust gases—after leaving a raw-powder-preheater—are conducted into the lower portion of a vertically extending moistening compartment. Water in an excess amount is sprayed into the upwardly moving gas stream and the excess water loaded with dust collects in a sump at the bottom of the compartment. A pump withdraws the muddy water from the sump and discharges it firstly into nozzles tangentially extending into the sump to circulate its content, and secondly into the upper portion of the compartment to wet the inner wall of the same. Another pump conveys a portion of the muddy water from the sump to the raw-powder-preheater at a point before the one where the raw-powder is introduced.

---

The invention relates to a method for the improvement of dust removal from exhaust gases produced by an installation for manufacture of cement and consisting essentially of furnace, raw-powder-preheater and electrofilter. The dust removal is accomplished by an increase of the dewpoint of the exhaust gases. The invention also covers devices for carrying out the method. A method serving the same purpose is known, in which water is sprayed into a cooler for the material to be discharged, which cooler is connected ahead of and in series with the rotating furnace. With this known method, the dewpoint of the exhaust gases may probably be acted on before the dust-removing-filter; a cooling effect will, however, not be attained at this point. For the cooling of the exhaust gases ahead of the filter, it has already been suggested to spray water into the raw-powder-preheater arranged between the rotating furnace and the filter. However, it is difficult to attain continuously the highest possible dewpoint of the exhaust gases. Upon the occurrence of residual moisture are formed incrustations and obstructions, and when little water is used, the temperature rises and lowers the dewpoint of the exhaust gases above or below, respectively, the optimum value.

According to other suggestions, the cooling and moistening of the exhaust gases is undertaken in a compartment inserted between raw-powder-preheater and filter in the gas current (known, for example, are hurdle-type washer or wash-cooler, respectively, see Handbook of the Dust Technique (Handbuch der Staubtechnik,) 1953, vol. 2, page 180, VDI-publishing house). In this manner one may operate with so much excess water, that optimum values are to be insured for the dewpoint and the temperature of the exhaust gases. The problem is, however, the removal or treatment, respectively, of the slurry produced with the excess water.

It is an object of the invention to find means and ways for obtaining in a simple manner a highest degree of cooling of the exhaust gases at the highest possible dewpoint of the same and simultaneously insure a high degree of safety of operation by means of prevention of incrustations, and obstructions, as well as to overcome difficulties during the removal of the slurry.

According to the present invention so much water is sprayed into the gases flowing through the moistening compartment connected ahead and in series with the filter that excess water is formed and that the latter brought together with the dust particles therein is introduced into the raw-powder-preheater.

Even though this method is to be employed mainly in installations with electrofilters, its application in connection with filters of other types is also of advantage because it protects filter fabrics, supply devices, etc.

The moistening compartment is suitably kept free from adherent materials and incrustations, in that the inner wall of the moistening compartment is sprayed with excess water. For the maintenance of a condition of equilibrium, it is of advantage to supervise and to control the excess water collected in the sump of the moistening compartment with respect to its quantity and its physical condition. To this end, the invention provides that the quantity of the water sprayed into the moistening compartment from the quantity of the excess slurried water collected or/and of its physical characteristics, such as viscosity or specific weight, is controlled or regulated dependently.

A circulating movement of the gases rising in the moistening compartment may favor the separation of drops in front of the filter. In accordance with the invention, it is recommended that the excess water in the raw-powder-preheater, viewed in material flow direction is sprayed into the material after the raw-powder-delivery point. The strongly preponderant portion by weight of the raw-powder as compared with the slurry-content of the excess water results in a turbulent motion with the exhaust gases, which at this point have a temperature of approximately 500° C., in a stream of mixture not inclined to adherences or incrustations. For the spraying operation are employed with advantage turbulence nozzles.

With devices for carrying out the method, it is important to take care of constant revolution of the excess water collecting and clogging or muddying in the sump of the moistening compartment. This is accomplished in a particularly simple and effective manner, for example, in that to a correspondingly efficiently dimensioned pump there are attached for the supply of the excess water for spraying of the inner wall of the shaft or compartment, spray pipes extending tangentially into the sump. Otherwise effective, for example, mechanical revolution devices as they are in use in the art for manifold purposes, may likewise be employed.

A second pump is provided for the conveyance of excess water from the sump into the raw-powder-preheater.

The devices according to the invention employs at suitable points, measuring-, control-, and/or regulating devices, which make the maintenance of an optimum favorable condition possible, that is, both for the removal of dust as well as also for the economy of heating the installation. For this purpose are employed level indicators as well as manometrically operating indicators for viscosity and weight of the excess water count, also switch-, control-, and regulating-members, with which in the sense of the maintenance of the aforementioned operational values, the quantity of the fresh water supplied, the revolution of the running water and the discharge of the excess-slurry water intended for spraying into the raw-powder-preheater may be controlled.

In the drawing is shown diagrammatically an example of the device serving for carrying out the method.

A rotating furnace 1 for the production of cement is traversed in direction of the arrow by the furnace gases. The gases in a rising main flow direction pass through a group of consecutively connected cyclones 2, which serve for the preheating of the raw-powder-cement. The raw-powder-cement flows through this aggregate in known manner against the main direction of flow of the gases. A blower 3 withdraws the gases from the cyclones and conveys the gases to the lower portion of a vertically extending cooling- and moistening-compartment 4, through which the gases flow in rising direction. By means of a fresh water inlet, for example, represented by a pump 5, water is fed into the compartment 4, and control members 6 adjust the fresh water supply for example in relation to the water level above the bottom of the compartment 4, the so-called muddy water-sump 8. The fresh water is sprayed finely divided by means of nozzles 7 into the compartment 4. Insofar as the fresh water does not evaporate in the rising gases, it precipitates in the form of dust-laden drops on the floor or on the inner wall 12 of the compartment 4 and collects in the sump 8 as muddy excess water. By means of a water-pipe 9 and a pump 10, the excess-muddy water is forced into the overflow-ring-trap 11 from where it uniformly moistens the inner wall 12 of the compartment. Furthermore spray pipes 13 are likewise connected with the muddy water pump 10 and extend tangentially into the sump 8. Through the kinetic energy of the muddy water jets, the contents of the sump is caused to perform a circular movement, so that it does not come to any stagnant deposits. With a constant number of revolutions of the pump 10, the built up fluid pressure is dependent on the weight and on the viscosity of the muddy water. A manometer, not shown in the drawing, may accordingly furnish an indication, under the mentioned prerequisities, as to whether the muddy water has the desired consistency, or whether more or less fresh water should be supplied or whether more or less excess water is to be sprayed into the raw powder-preheater 2. Other members 6a of a type known per se, may, however, also be employed for determination of the specific weight and/or viscosity of the excess water, for example in operative connection with an adjusting member for the feed quantity of the pump 17. The greatly cooled and moistened gases in the compartment 4, are conveyed to the electrofilter 14 and after the electro-dust-removal are conveyed through the blower 16 into the atmosphere. The dust dropping down in the dust discharge 15 may in known manner again be used for the cement production method.

The muddy excess water loaded with dust particles is withdrawn from the sump 8 by means of the pump 17 and by means of turbulence nozzles 18 is sprayed into the gas conduit leading to step 2a of the cyclone group 2 mainly carried out as double-cyclone, last viewed in direction of the gas flow. At suitable distance in front of the turbulence nozzles 18, likewise viewed relatively to the direction of gas flow, is disposed the raw-powder delivery point 19 constructed according to known art. From the gas, which in this area still has a temperature of about 500° C. a considerable quantity of heat will be removed or extracted by the introduced cool raw powder. Nevertheless, the spraying in of muddy water taking place shortly thereafter causes a further cooling off of the gases through removal of evaporation heat and heating of the dust precipitated by the evaporation. By means of the spraying-in of the muddy water in the gases loaded with raw powder, a substantial part of the muddy water agglomerizes with the raw powder particles, so that only relatively little fine-grain results, which in the last cyclone step 2a is not separated and accordingly once more passes through the blower 3 and into the compartment 4.

With the method and devices according to the invention, a highest possible cooling of the exhaust gases is attained at a highest possible dewpoint, without that in this way loss of heat is incurred. Owing to the quality of the exhaust gases attained, the filter may be dimensioned smaller than heretofore. Incrustations in the moistening compartment, in the cyclone group as well as depositions of mud are effectively prevented, furthermore no waste mud is produced whose removal is always problematic and only possible with appreciable expenditures. Due to the fact that muddy water is sprayed into the raw-powder-preheater, not only the solids contained therein are again supplied to the manufacturing method, but they themselves effect already a cooling of the gases—which is of advantage in the interest of a small as possible supply of water to the raw-powder-preheater itself.

What I claim is:

1. In the manufacture of cement, the method of removing the dust from a stream of hot exhaust gases discharged by a raw-powder-preheater and flowing to an electrofilter, the steps of continuously causing the exhaust gases to flow upwardly in a vertical direction through a scrubbing tower, spraying fresh water into the lower portion of the vertical stream of exhaust gases in such an amount to cool the hot exhaust gases and to increase the dew point of the latter so that an excess of water forms, collecting said excess of water together with dust particles deposited in said water to form a muddy water sump below the lower end of said vertical stream of exhaust gases, and introducing such an amount of muddy water from said sump into said raw-powder-preheater and the upper portion of said scrubbing tower, that the amount of muddy water in said sump remains substantially constant and thereafter passing said vertical stream of exhaust gases to said electrofilter.

2. The method according to claim 1, wherein the quantity of fresh water sprayed into said stream of exhaust gases is also controlled in relation to the amount of muddy water collected in said sump.

3. The method according to claim 1, wherein the quantity of fresh water sprayed into said stream of exhaust gases is also controlled in relation to the viscosity of the amount of muddy water collected in said sump.

4. A device for removing dust from the hot exhaust gases of a cement manufacturing installation, comprising means forming a vertically extending cooling and moistening compartment, means forming at the upper end of said compartment a ring-shaped trough for receiving water and discharging it into said compartment downwardly along the entire inner wall thereof, means forming at the lower end of said compartment an excess water sump, means for introducing hot, dust-laden exhaust gases into the lower portion of said compartment and causing said gases to flow upwardly in said compartment, nozzle means for spraying fresh water into said compartment below the point where said dust-laden exhaust gases are introduced, spray pipes extending from the exterior of said compartment tangentially into said excess water sump which is formed of muddy water containing dust removed from said exhaust gases, and means for withdrawing muddy water from said excess water sump and conveying a portion of it into said spray pipes for causing the water in said sump to circulate and conveying at the same time another portion of said withdrawn muddy water into said ring-shaped trough for wetting the entire inner wall of said compartment.

5. A device according to claim 4, including a raw-powder-preheater in said cement manufacturing installation from which hot dust-laden exhaust gases are conducted into said lower portion of said compartment, and means for supplying muddy water from said excess water sump to said raw-powder-preheater.

6. A device according to claim 4, including a control and regulating-device for changing the fresh water feed for selectively maintaining a predetermined water level in said excess water sump, a predetermined value of viscosity, and a specific weight of the excess water, respectively.

7. A device according to claim 4, including a raw-powder-preheater in said cement manufacturing installation from which hot dust-laden exhaust gases are conducted into said lower portion of said compartment, and means for supplying muddy water from the excess water sump to said raw-powder-preheater, said means comprising a pump and turbulance nozzles supplied by said pump and discharging the muddy water into a conduit leading to a cyclone means of said raw-powder-preheater.

References Cited

UNITED STATES PATENTS

| | | | |
|---|---|---|---|
| 1,169,764 | 2/1916 | Byassert | 55—94 |
| 3,167,413 | 1/1965 | Kiekens et al. | 55—227 |
| 3,212,235 | 10/1965 | Markant | 55—89 |
| 3,260,035 | 7/1966 | Wheelock et al. | 55—73 |

FOREIGN PATENTS 622,989  5/1949  Great Britain.

REUBEN FRIEDMAN, Primary Examiner

CHARLES N. HART, Assistant Examiner

U.S. Cl. X.R.

55—94, 227, 223, 9